Patented Mar. 11, 1952

2,589,004

UNITED STATES PATENT OFFICE 2,589,004

PROCESS FOR PRODUCING COUPLERS FROM BI-FUNCTIONAL AMINES

Arnold Weissberger and Charles O. Edens, Jr., Rochester, N. Y., assignors to Eastman Kodak Company, Rochester, N. Y., a corporation of New Jersey No Drawing. Application November 4, 1948, Serial No. 58,352

6 Claims. (Cl. 260—310)

This invention relates to photographic color forming or coupling compounds and particularly to couplers made from bi-functional intermediates having aliphatic and aromatic amino groups.

The formation of colored photographic images by coupling the development product of aromatic amino developing agents with color forming or coupling compounds is well known. In these processes the subtractive process of color formation is ordinarily used and the image dyes are intended to be of complementary subtractive primary colors, cyan or blue-green, magenta and yellow. The couplers which produce the cyan dyes are usually phenols or naphthols, those producing the magenta dyes are ordinarily pyrazolones or cyanoacetyl compounds and those producing the yellow dyes are ordinarily compounds containing a methylene group having two carbonyl groups attached to it. The dyes produced by coupling are azomethines, indamines or indophenols depending upon the composition of the coupler and of the developer.

In the production of coupler compounds it is a well-known practice, especially if the couplers are to be used in emulsion layers, to introduce into the molecule, weight increasing and solubilizing groupings of such size or configuration that the couplers tend to be non-diffusible in the emulsion layer and the dyes resulting from color-development will have similar diffusion characteristics in addition to possessing the desired spectral absorptions.

One difficulty in prior art methods is the relatively limited means of introducing the desired groupings into the coupler molecule. If long alkyl groups are used to increase the size of the molecule, the couplers tend to be too oily or incompatible with the emulsion. Similar properties result if aryl groups are used entirely for increasing the size of the coupler molecule. Therefore, the desired coupler configuration should include a proper balance of both aliphatic and aromatic constituents. A common means of producing such couplers is to provide an amino or acid chloride grouping on the coupler proper and reacting with a weight increasing compound having an amino or acid chloride group.

We have found that novel couplers having the desired configuration and characteristics may be easily made through use of a bi-functional intermediate which may be reacted selectively with coupler and weight-increasing compounds.

One object of our invention is to provide methods of producing novel couplers by means of bi-functional intermediates. Another object is to provide novel couplers suitable for use in emulsion layers or color-forming developer solutions used in processes of subtractive color photography. A further object is to provide a process for selectively reacting a chemical intermediate with coupler and weight increasing groups to produce couplers having the desired solubility and spectral absorption characteristics. Other objects will appear from the following description of our invention.

These objects are accomplished by acylating the alkyl amino group of an amino phenol alkyl amine intermediate with an ester and then acylating the aromatic amino group of the diamine with a second acylating agent, either acylating agent providing a coupler or a weight-increasing group in the final molecule.

The bi-functional intermediates used in our invention have the following structure.

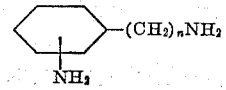

where $n$ is a positive integer of the order of 1 to 10 or more, preferably 1 to 5, and the aromatic amino group is preferably in the meta or para positions. Typical compounds of this class are m- or p-amino-β-phenylethylamine, p-amino-Δ-phenyl butyl amine, p-amino-Z-phenyl hexyl amine, and p-amine (phenyl methyl) amine. These compounds are made by reduction of either the corresponding amino phenyl alkyl nitrile or the nitro phenyl alkyl amine. The following procedure may be used when reducing the nitrile: p-Amino-phenylacetonitrile is reduced in a medium of liquid ammonia and methanol using Raney nickel as the catalyst. A bomb is cooled below the boiling point of the ammonia and the nitrile, methanol and ammonia are added along with the catalyst. The bomb is filled with hydrogen at a pressure of 1500 lbs./sq. in. The charge is then heated at 105° C. for 2 hours. After removal of the low-boiling fraction, a diamine distilling at 117–119° C./2 mm. is obtained. The colorless diamine of refractive index $$n\frac{25}{D} - 1.5915$$

solidifies at room temperature when pure. If the starting material is the nitro phenyl alkyl amine such as p-nitro-β-phenylethyl amine the reduction is carried out as above under hydrogen at 100–125° C. and the product isolated by distillation under reduced pressure. Other isomeric or homologous intermediates used in our invention are prepared in a similar manner using the corresponding amino phenyl alkyl nitriles or nitro phenyl alkyl amines. If desired, the nucleus of the diamine may, for example, be substituted with halogen, alkyl or phenoxy groups.

Typical couplers obtained from the above intermediates are the following:

(1)
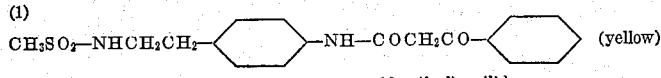 (yellow)

Benzoylacet-4 (β-methanesulfonamido ethyl) anilide (2)
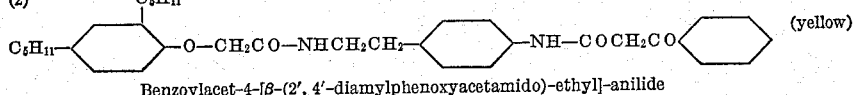 (yellow)

Benzoylacet-4-[β-(2', 4'-diamylphenoxyacetamido)-ethyl]-anilide (3)
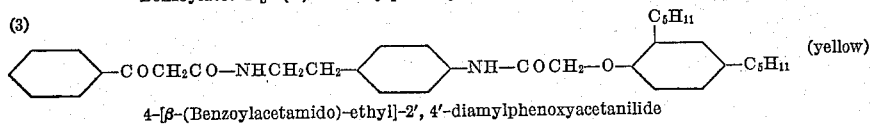 (yellow)

4-[β-(Benzoylacetamido)-ethyl]-2', 4'-diamylphenoxyacetanilide (4)
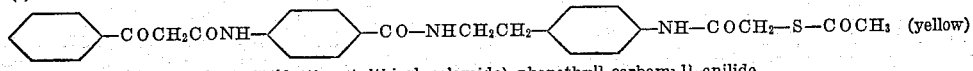 (yellow)

Benzoylacet-{4-[β-(4'-acetylthioglycolamido)-phenethyl]-carbamyl}-anilide (5)
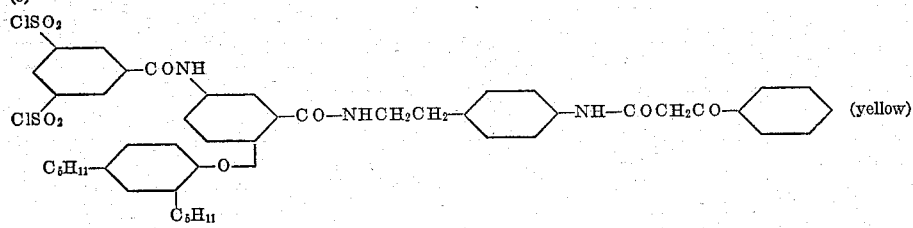 (yellow)

Benzoylacet-4-{β-[2'-(2'', 4''-diamylphenoxy)-5-(3', 5'-dichlorosulfonyl-benzamido)-benzamido]-ethyl}-anilide (6)
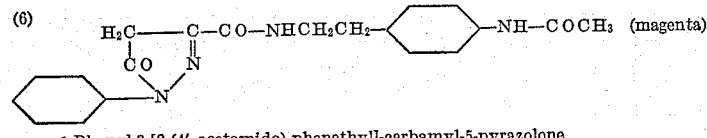 (magenta)

1-Phenyl-3-[β-(4'-acetamido) phenethyl]-carbamyl-5-pyrazolone (7)
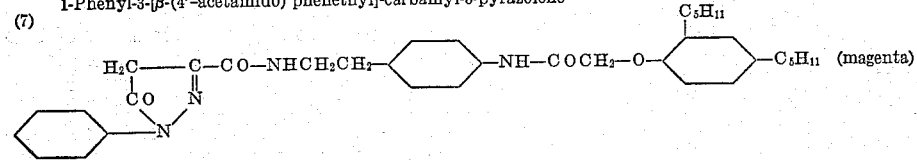 (magenta)

1-Phenyl-3-{β-[4'-(2'',4''-diamylphenoxy) acetamido]-phenethyl}carbamyl-5-pyrazolone (8)
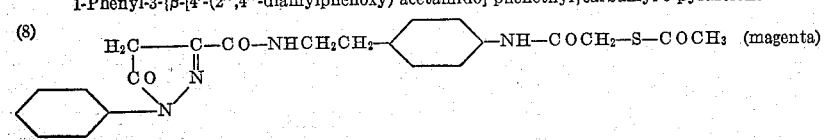 (magenta)

1-Phenyl-3-[β-acetylthioglycolamido) phenethyl]-carbamyl-5-pyrazolone (9)
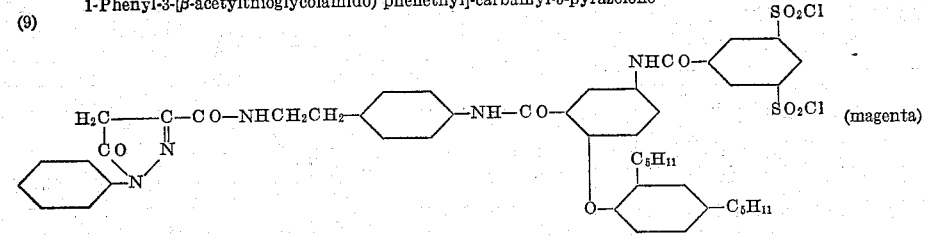 (magenta)

1-Phenyl-3-{β-{4'-[2''-(2''',4'''-diamylphenoxy)-5-(3',5'-dichlorosulfonylbenzamido)] benzamido}-phenethyl}carmbamyl-5-pyrazolone

(10)
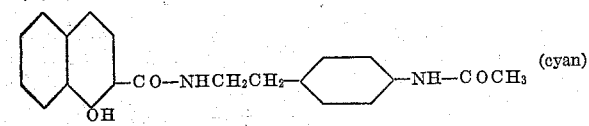 (cyan)

1-Hydroxy-2-[β-(4'-Acetamido) phenethyl] naphthamide

(11)
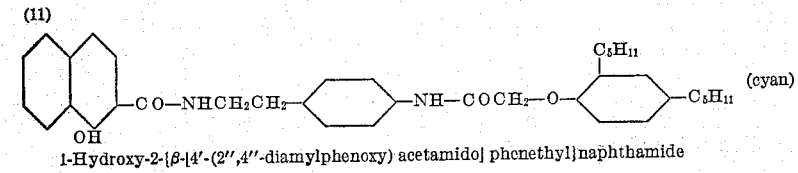 (cyan)

1-Hydroxy-2-{β-[4'-(2'',4''-diamylphenoxy) acetamido] phenethyl}naphthamide

(12)
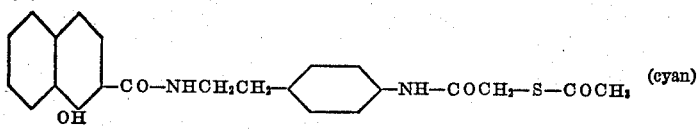
1-Hydroxy-2-[β-(4'-Acetylthioglycolamido)phenethyl]-naphthamide

(13)
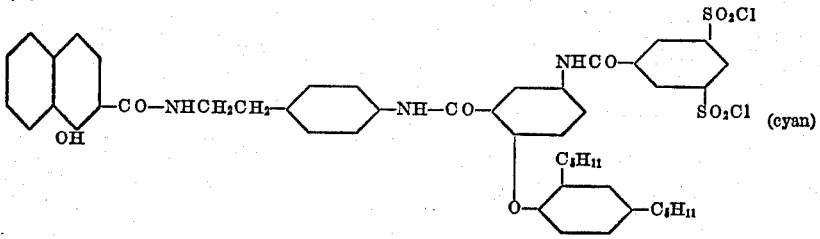
1-Hydroxy-2-{β-[4'-[2''-(2'''4''''-diamylphenoxy)-5''-(3''',5'''-dichlorosulfonylbenzamido)]benzamido(phenethyl}-naphthamide

(14)
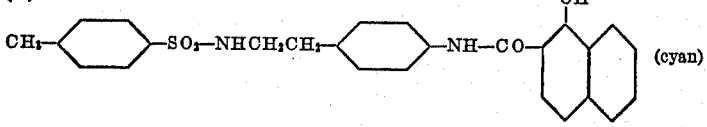
1-Hydroxy-2-{4'[β-(4''-toluenesulfonamido)ethyl]}-naphthanilide

(15)
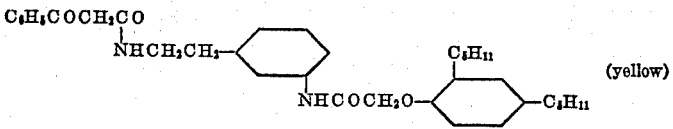
3-[β-(Benzoylacetamido)-ethyl]-2',4'-diamylphenoxyacetanilide

(16)
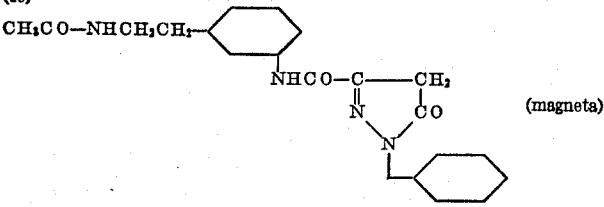
1-Phenyl-3-[3'-(β-acetamidoethyl)phenyl]-carbamyl-5-pyrazolone

(17)
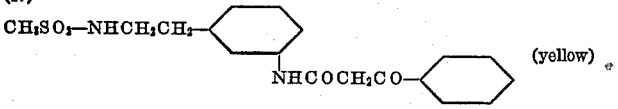
Benzoylacet-3-(β-methanesulfonamidoethyl)-anilide

The colors indicated in brackets above refer to the color of dye obtained in color-development.

In general, the above couplers are obtained by first reacting the aliphatic amino group of the diamine with an ester such as carboxylic acid ester or a sulfonic acid ester and then acylating the aromatic amino group with a second acylating agent, either of the acylating agents having a group reactive with the development product of a color developer. We have found that the first acylation must be carried out using an ester because an acid chloride or anhydride tends to acylate both amino groups. Lower alkyl esters such as ethyl and butyl esters may be used but phenyl esters are preferred mainly because of better yields and ease in control of the reaction. The acylation with lower alkyl esters proceeds at higher temperatures than with the phenyl esters, and accordingly lower temperatures of the order of 100° C. must be maintained to prevent simultaneous acylation of both amino groups. However, an ester such as phenyl acetate will give a large proportion of the monoamide at 80-100° C. and a mixture of mono and di-amide at about 150° C., thus to insure maximum yield and purity, temperatures below 80° C. are advisable. In general, in the acylation of the alkyl amino group with such carboxylic acid esters, we maintain fairly constant temperature control and distill out the resulting alcohol or phenol under reduced pressure.

In the acylation of the aromatic amino group of the diamine a number of well-known methods may be used such as those employing an acid chloride, anhydride or ester. The following examples are given as illustrative of methods of making the couplers of our invention.

*Example 1*

Coupler No. 17 above is prepared by heating an equimolecular mixture of m-amino-β-phenethylamine and phenyl methane sulfonate, rapidly to refluxing temperature over a period of 10 minutes during which time the temperature rose to 258° C. and fell to 237° C. The reaction does not proceed well at 100° C. but may be carried out at 200–210° C. if heating is prolonged to about 5 hours. After cooling the reaction product, it is dissolved in 95% ethyl alcohol, chilled to 0° C. to obtain plate crystals which are filtered off, washed with cold alcohol and ether and dried at 50° C. The product has a melting point of 85–86° C. The acylation of the second amino group is effected by heating a mixture of equal molecular parts of the above mono-amide and ethyl benzoyl acetate in a solvent such as xylene at about 150° C. in a still so devised that the alcohol formed will be removed over the course of the reaction in 30–60 minutes. The resultant product is recrystallized from glacial acetic acid, alcohol or dioxane. The resultant coupler used in a color-development process gave a yellow dye. Other acylaceto groups may be introduced into the coupler molecule in a similar manner. The following equations illustrate the above preparations.

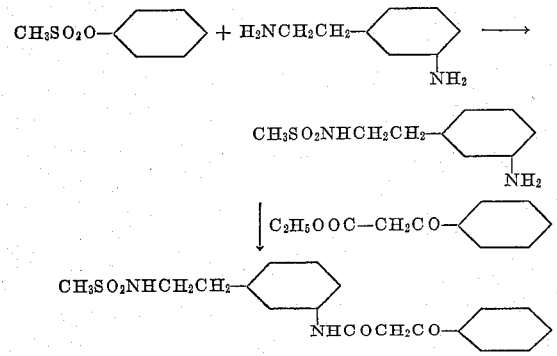

*Example 2*

Coupler No. 10 is prepared by heating a mixture of equal molecular parts of phenyl-1-hydroxy-2-naphthoate and p-amino-β-phenethylamine at 150° C. to form the mono-amide. After distillation of the phenol from the product, it is heated with a mixture of acetic acid, sodium acetate and acetyl chloride at the boiling point for 2 minutes. The diamide coupler compound which separates has a melting point of 228–229° C. and a yield of 94% is obtained. If desired, methane sulfonyl chloride or p-toluene sulfonyl chloride may be used in place of acetyl chloride in the second acylating step. Likewise, phenyl salicylate may be used in place of the phenyl naphthoate in the first acylating step. The following equations illustrate the above preparation.

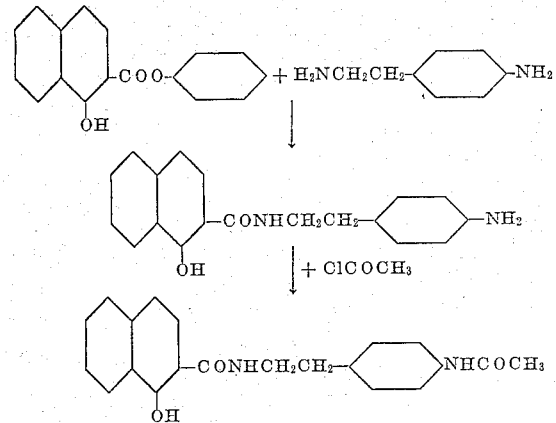

*Example 3*

Coupler No. 13 is prepared by reacting equal moles of phenyl-1-hydroxy-2-naphthoate and p-amino-β-phenethylamine as described in Example 1 but at a lower temperature of 100–150° C. since the phenyl naphthoate is more reactive than sulfonic esters. After purification by distillation the resulting 1-hydroxy-2-(β-4'-aminophenethyl)naphthamide is reacted with an equimolecular amount of 2-(2',4'-diamyl phenoxy)-5-nitrobenzoyl chloride in acetic acid using sodium acetate as the condensing agent, the mixture being heated at 45–50° C. for 30 minutes. The product was precipitated from the reaction mixture with water and recrystallized from 90% acetic acid as yellow plates of melting point 191–192° C. The resulting nitro coupler can be used as a coupler without further reaction or it may further be reduced with iron filings and acetic acid to the corresponding amine, then heated, in the presence of pyridine or quinoline and a solvent such as dioxane, with 2,4-disulfobenzoyl trichloride to obtain the required coupler. This coupler may be hydrolyzed before incorporated into a photographic emulsion as described in the copending Salminen et al. U. S. application Serial No. 774,890, filed September 18, 1947, and yields cyan dye images with primary aromatic amino developing agents.

*Example 4*

Coupler No. 1 is prepared in the same manner as coupler No. 18 as described in Example 1 but substituting p-amino-β-phenethyl amine for m-amino-β-phenethyl amine in the reaction mixture.

*Example 5*

Coupler No. 5 is prepared by heating at about 150° C. as described in Example 1, a mixture of p-amino-β-phenethyl amine and phenyl-2-(2',4'-diamylphenoxy)-5-nitrobenzoate and removing the phenol formed by means of distillation or crystallization from solvent. The aromatic amino group of the resultant product is then acylated by heating with ethyl benzoyl acetate at about 150° C. following which the nitro group is reduced with iron filings and acetic acid. The resultant diamide product containing a free aromatic amino group is then acylated with 2,4-disulfobenzoyl trichloride by heating in pyridine and dioxane. The final product is recrystallized from dioxane. The coupler is dispersed in a photographic emulsion as described in the Salminen et al. application and forms a yellow colored dye on color development.

*Example 6*

Coupler No. 9 is prepared by first heating p-amino-β-phenethyl amine with 1-phenyl-3-carbophenoxy-5-pyrazolone in equimolecular proportions at 150° C. and distilling out the phenol formed. The resulting monoamide is then heated with 2-(2',4'-diamylphenoxy)-5-nitrobenzoyl chloride in acetic acid and sodium acetate to effect acylation of the aromatic amino group. Thereafter, the nitro group of the product is reduced with iron filings and acetic acid and acylated with 2,4-disulfobenzoyl trichloride as in Example 3.

*Example 7*

Coupler No. 2 is prepared by heating p-amino-β-phenethyl amine with 2,4-diamyl phenoxy phenyl acetate at about 250° C. for a short time and removing the phenol formed, by distillation under reduced pressure. The aromatic amino group of the resulting product is then acylated by heating with benzoyl phenyl acetate. Couplers of this type are dispersed in photographic emulsion layers using coupler solvents as described in Jelley and Vittum U. S. Patent 2,322,027, granted June 15, 1943.

Example 8

Coupler No. 3 is prepared in the manner of our invention and Example 7 by first heating the diamine with benzoyl phenyl acetate or other acylaceto ester at 250° C. or lower if the ethyl ester is used, thereafter acylating the aromatic amine group with 2,4-diamyl phenoxy acetyl chloride in pyridine and acetic acid. The resultant coupler is incorporated into emulsion layers by means of coupler solvents.

Example 9

Coupler No. 4 is prepared by treating p-aminophenyl-benzoate with ethyl benzoylacetate and reacting the resultant product with p-amino-β-phenethylamine at 250° C. and separating the phenol formed from the product by distillation or recrystallization. The free aromatic amino group is then acylated by treatment in dioxane with acetylthioglycolyl chloride (prepared as described in Weissberger et al. U. S. application Ser. No. 539,780, filed June 10, 1944, U. S. Patent 2,448,939) in the presence of quinoline. After the reaction is complete, the product is washed with water and alcohol and recrystallized from alcohol. The resulting coupler gives a yellow colored dye image on color development. A coupler of this type is particularly suitable for incorporation into an emulsion with a coupler solvent.

Example 10

In the preparation of couplers Nos. 6, 7 and 8, the aliphatic amino group of an amino phenyl alkyl amine such as p-amino-β-phenethyl amine is acylated as described in Example 6 by heating with the pyrazolone ester. The free aromatic amino group of the resulting pyrazolone amide is then acylated in a well-known manner with acetyl chloride, 2,4-diamylphenoxyacetyl chloride or acetyl thioglycolyl chloride in a solvent such as quinoline and dioxane. The resulting couplers give magenta colored dye images on color development. The following equations illustrate the preparation of coupler No. 6.

Example 11

In the preparation of couplers Nos. 11 and 12 the aminophenylalkyl amine is acylated at the aliphatic amino group with phenyl-1-hydroxy-2-naphthoate at 100–150° C. as described in Example 2. The aromatic amino group of the resulting amide is acylated with 2,4-diamylphenoxyacetal chloride or acetylthioglycolyl chloride in dioxane and quinoline.

Example 12

Coupler 14 is prepared by first acylating p-amino-β-phenethylamine with phenyl p-toluene sulfonate.

When acylating the diamine with phenyl p-toluene sulfonate the two compounds are heated together at about 150° C. and the phenol distilled out under reduced pressure.

The resulting amide is then further acylated with phenyl-1-hydroxy-2-naphthoate by heating, removing the phenol formed and recrystallizing the product.

Example 13

In the preparation of couplers Nos. 15 and 16, m-amino-β-phenethylamine is acylated first with phenyl benzoyl acetate or phenyl acetate in the first case at 250° C. and in the latter preferably at about 30° C. as described in Example 1. The acylation of the aromatic amino group of the respective amides is carried out with 2,4-diamylphenoxy acetyl chloride and 1-phenyl-3-carbonyl chloride-5-pyrazolone in dioxane and quinoline following which the diamides are washed and recrystallized with alcohol.

It is apparent from the above examples that by choice of the proper reactants and conditions for acylating the aminophenyl-alkylamine, couplers having widely diverse structures may be produced. If the couplers have solubilizing groups such as hydroxyl or sulfonic acid, they may be used readily in color-developing solutions on sensitive emulsions. Other couplers not so soluble are more adaptable to incorporation into the silver halide emulsions as dispersions by means of coupler solvents. Water-insoluble, water-permeable solvents for the couplers include materials such as cellulose esters, synthetic resins and high boiling crystalloidal materials. Methods for utilizing the couplers in this way are described in Martinez U. S. Patent 2,269,158, granted January 6, 1942, Mannes et al. U. S. Patent 2,304,940, granted December 15, 1942, and Jelley et al. U. S. Patent 2,322,027, granted July 15, 1943.

Our couplers may be incorporated in gelatino-silver halide emulsion layers or in silver halide

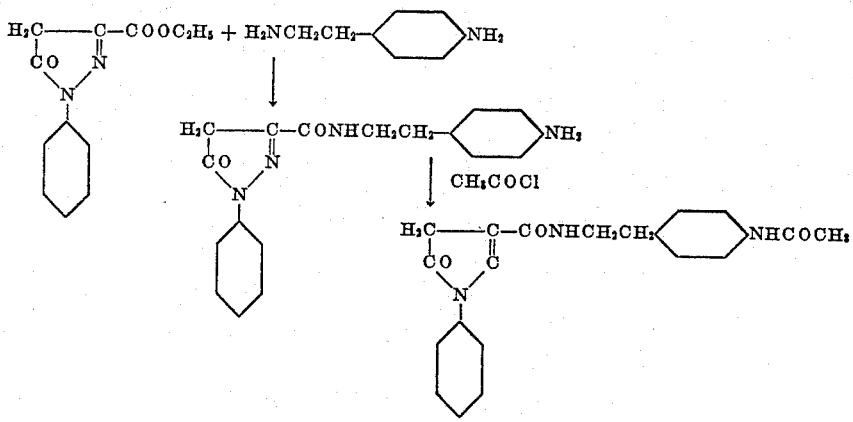

emulsions in other carriers such as water-soluble organic esters of cellulose or synthetic resins. The carrier may be supported by a transparent medium such as glass, cellulose ester or a non-transparent reflecting medium such as paper or an opaque cellulose ester. The emulsion may be coated as a single layer on the support or as superposed layers on one or both sides of the support.

The examples and compounds set forth in the present specification are illustrative only and it is to be understood that our invention is to be taken as limited only by the scope of the appended claims.

What we claim is:

1. A method for preparing a photographic coupler compound from a primary aminophenylalkylamine which comprises first acylating only the amine group directly attached to the alkyl radical of said amine, with a phenyl ester of a carboxylic acid selected from the group consisting of 1-hydroxy-2-naphthoic acid, phenyl-2-(2',4'-diamylphenoxy)-5-nitro benzoic acid, 1-phenyl-3-carboxy-5-pyrazolone, 2,4-diamylphenoxy acetic acid, benzoyl acetic acid, p-benzoylacetamido benzoic acid, acetic acid, methane sulfonic acid and p-toluene sulfonic acid, at a temperature at which substantially only said amine group is acylated, then acylating the amine group attached to the phenyl radical of the resulting amide with an acylating agent, one of said phenyl ester and acylating agent containing a group selected from the class consisting of phenolic hydroxyl and methylene groups capable of reacting with the oxidation product of a primary aromatic amino photographic developing agent to form a dye.

2. A method for preparing a photographic coupler compound from a primary aminophenylalkylamine which comprises first acylating only the amine group directly attached to the alkyl radical of said amine, with benzoyl phenyl acetate, at a temperature at which substantially only said amine group is acylated, then acylating the amine group attached to the phenyl radical of the resulting amide.

3. A method for preparing a photographic coupler compound from a primary aminophenylalkylamine which comprises first acylating only the amine group directly attached to the alkyl radical of said amine, with the phenyl ester of benzoylacetamidobenzoic acid, at a temperature at which substantially only said amine group is acylated, then acylating the amine group attached to the phenyl radical of the resulting amide.

4. A method for preparing a photographic coupler compound from a primary aminophenylalkylamine which comprises first acylating only the amine group directly attached to the alkyl radical of said amine, with phenyl-1-hydroxy-2-naphthoate, at a temperature at which substantially only said amine group is acylated, then acylating the amine group attached to the phenyl radical of the resulting amide.

5. A method for preparing a photographic coupler compound from a primary aminophenylalkylamine which comprises first acylating only the amine group directly attached to the alkyl radical of said amine, with 1-phenyl-3-carbophenoxy-5-pyrazolone, at a temperature at which substantially only said amine group is acylated, then acylating the amine group attached to the phenyl radical of the resulting amide.

6. A method for preparing a photographic coupler compound from a primary aminophenylalkylamine which comprises first acylating only the amine group directly attached to the alkyl radical of said amine, with phenyl-2-(2',4'-diamylphenoxy)-5-nitrobenzoate, at a temperature at which substantially only said amine group is acylated, then acylating the amine group attached to the phenyl radical of the resulting amide with ethyl benzoyl acetate.

ARNOLD WEISSBERGER.
CHARLES O. EDENS, Jr.

REFERENCES CITED

The following references are of record in the file of this patent:

UNITED STATES PATENTS

| Number | Name | Date |
|---|---|---|
| 2,312,986 | Graenacher et al. | Mar. 2, 1943 |
| 2,498,466 | Thompson et al. | Feb. 11, 1950 |

OTHER REFERENCES

Beilstein, 4th ed., vol. 13 (1930), p. 170; citing: Paal-Ber. v. 24: 3053 and v. 27: 42.